United States Patent
Bünder (10) Patent No.: US 9,482,340 B2
(45) Date of Patent: Nov. 1, 2016

(54) SHIFT ARRANGEMENT FOR A MOTOR VEHICLE TRANSMISSION

(71) Applicant: GETRAG Getriebe-und Zahnradfabrik Hermann Hagenmeyer GmbH & Cie KG, Untergruppenbach (DE)

(72) Inventor: Carsten Bünder, Stuttgart (DE)

(73) Assignee: GETRAG Getriebe-und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 38 days.

(21) Appl. No.: 14/265,589

(22) Filed: Apr. 30, 2014

(65) Prior Publication Data

US 2014/0326094 A1 Nov. 6, 2014

(30) Foreign Application Priority Data

May 3, 2013 (DE) .................. 10 2013 104 552

(51) Int. Cl.
*B60K 20/00* (2006.01)
*F16H 59/04* (2006.01)
(Continued)

(52) U.S. Cl.
CPC .............. *F16H 61/68* (2013.01); *F16H 61/30* (2013.01); *F16H 61/688* (2013.01); *F16H 63/3013* (2013.01); *F16H 2061/2838* (2013.01); *F16H 2306/00* (2013.01); *Y10T 74/19251* (2015.01)

(58) Field of Classification Search
CPC ............... F16H 2061/2823; F16H 2061/2853; F16H 61/705

USPC ................. 74/335, 473.21, 473.36
See application file for complete search history.

(56) References Cited

U.S. PATENT DOCUMENTS 4,223,572 A * 9/1980 Weiertz ............ F16H 3/54
 192/12 B
5,381,878 A * 1/1995 Ohshima .......... F16D 23/02
 192/114 T (Continued)

FOREIGN PATENT DOCUMENTS

CN 101846184 A 9/2010
DE 102004038955 A1 3/2005

(Continued)

OTHER PUBLICATIONS

European Search Report dated Oct. 13, 2014, 9 pages.

(Continued)

*Primary Examiner* — Ha D Ho
(74) *Attorney, Agent, or Firm* — Reising Ethington P.C.

(57) ABSTRACT

Shift arrangement for a motor vehicle transmission. At least one gear stage can be engaged and disengaged by means of an associated shift clutch. A spindle which is aligned along a spindle axis, has a spindle thread and is rotatably mounted on a housing. A nut has a nut thread, which is in engagement with the spindle thread. A shift finger is formed on the nut. At least one shift rod is mounted movably on the housing and can be coupled to the shift clutch. Provided on the housing are a radial groove, in which the shift finger engages in an axial base position of the nut and within which the shift finger can be turned, and an axial guide, which axially adjoins the radial groove and in which the shift finger can engage in order to hold the nut in the circumferential direction, thus ensuring that said nut is moved axially in a first axial direction when the spindle is rotated.

15 Claims, 4 Drawing Sheets

(51) Int. Cl.
  *F16H 61/68* (2006.01)
  *F16H 61/30* (2006.01)
  *F16H 61/688* (2006.01)
  *F16H 63/30* (2006.01)
  *F16H 61/28* (2006.01)

(56) References Cited

U.S. PATENT DOCUMENTS

| | | | |
|---|---|---|---|
| 5,696,680 A * | 12/1997 | Ichioka | B60L 3/00 180/292 |
| 7,026,770 B2 | 4/2006 | Hemphill et al. | |
| 7,303,043 B2 | 12/2007 | Hemphill et al. | |
| 7,721,615 B2 | 5/2010 | Ehrlich et al. | |
| 8,459,149 B2 * | 6/2013 | Suzuki | B60K 17/35 74/665 G |
| 2010/0242657 A1 | 9/2010 | Shintani et al. | |

FOREIGN PATENT DOCUMENTS

| | | |
|---|---|---|
| DE | 102007036336 A1 | 2/2009 |
| DE | 102010012752 A1 | 9/2010 |
| FR | 2938938 A1 | 5/2010 |
| JP | 2008174189 A | 7/2008 |
| JP | 2009270709 A | 11/2009 |
| WO | WO2005057051 A1 | 6/2005 |
| WO | WO2006076877 A1 | 7/2006 |
| WO | WO2010061100 A2 | 6/2010 |
| WO | WO2010061100 A3 | 6/2010 |

OTHER PUBLICATIONS

German Search Report dated Jan. 28, 2014, 5 pages.
Chinese Office Action for Application No. 201410184130.5 dated Dec. 16, 2015, 8 pages.
English Translation of Chinese Office for Application No. 201410184130.5 dated Dec. 16, 2015, 10 pages.

* cited by examiner

SHIFT ARRANGEMENT FOR A MOTOR VEHICLE TRANSMISSION

CROSS REFERENCES TO RELATED APPLICATIONS

This application claims the priority of German patent application DE 10 2013 104 552.9, filed May 3, 2013.

BACKGROUND OF THE INVENTION

The present invention relates to a shift arrangement for a motor vehicle transmission which has at least one gear stage that can be engaged and disengaged by means of an associated shift clutch, wherein the shift arrangement has a housing and at least one shift rod, which is mounted movably on the housing and can be coupled to the shift clutch.

The present invention furthermore relates to a method for actuating a shift clutch of a motor vehicle transmission.

Shift arrangements of this kind are known in the prior art. In general, a motor vehicle transmission has one shift clutch pack for every two gear stages, said pack consisting of two shift clutches, which can be actuated by means of a common sliding sleeve. In this case, the shift clutches can be dog clutches but are preferably synchronizing shift clutches. The motor vehicle transmission is preferably a spur gear transmission of layshaft construction.

In a conventional shift arrangement, each sliding sleeve is coupled to a shift rod. The shift rods each have grooves, in which a shift finger fixed on a shift shaft can engage. Here, the shift shaft can be arranged parallel to the shift rods. In this case, turning the shift shaft leads to a selecting operation, in which a particular shift rod is selected, and longitudinal movement of the shift shaft leads to a shifting operation, in which a shift clutch associated with the shift rod is actuated. Arranging the shift shaft transversely to such shift rods is also known. In this case, selecting is performed by a longitudinal movement of the shift shaft, and the shifting operation is initiated by a process of turning the shift shaft.

Equipping shift shafts with a plurality of shift fingers, each assigned to one shift fork, is also known. The shift forks each engage in associated sliding sleeves of shift clutch packs. Here, the shift rod is generally moved axially for shifting and is turned to select a shift fork. Providing each shift clutch on a shift shaft of this kind with a plurality of shift fingers arranged axially offset one behind the other is also known in this context. This makes it possible to leave one gear stage engaged and to engage a further gear stage. This is relevant particularly in the area of dual clutch transmissions. Dual clutch transmissions have two transmission sections, of which in each case one is used actively for power transmission and the other is inactive. A "following" gear stage is then generally preselected in the inactive transmission section, allowing a gear change from the initial gear stage to the following gear stage to be performed by overlapping actuation of two friction clutches.

For automated shift transmissions and dual clutch transmissions, it is also a known practice to provide each of the shift rods with a dedicated actuator, allowing the shift clutch packs to be actuated independently of one another.

The practice of using shift drums to actuate shift clutches is furthermore known in the vehicle transmission sector. Here, the shift drums have a shift drum contour in which a driving feature connected to a shift fork engages in such a way that rotary motions of the shift drum can be converted into axial motions of the shift fork. A known practice in the area of dual clutch transmissions is to assign each transmission section a dedicated shift drum. However, it is also possible to operate the two transmission sections by means of just one single shift drum. In the latter case, disadvantages in terms of shifting time arise from the sequential shift sequence. Moreover, the resulting diameter of the individual shift drum is very large, and therefore the shift arrangement occupies a relatively large space within the transmission housing.

SUMMARY OF THE INVENTION

Given the above background situation, it is an object of the invention to indicate an improved shift arrangement and an improved method for actuating a shift arrangement.

On the one hand, this object is achieved by a shift arrangement for a motor vehicle transmission which has at least one gear stage that can be engaged and disengaged by means of an associated shift clutch, having a housing, having a spindle, which is aligned along a spindle axis, has a spindle thread and is rotatably mounted on the housing, having a nut, which has a nut thread, which is in engagement with the spindle thread, wherein a shift finger is formed on the nut, and having at least one shift rod, which is mounted movably on the housing and can be coupled to the shift clutch, wherein a radial groove is provided on the housing, in which the shift finger engages in an axial base position of the nut and within which the shift finger can be turned, and wherein an axial guide is provided on the housing, which axially adjoins the radial groove and in which the shift finger can engage in order to hold the nut in the circumferential direction, thus ensuring that said nut is moved axially in a first axial direction when the spindle is rotated, and wherein the nut is coupled to the shift rod at least during one section of the axial movement, thus enabling a shift clutch coupled to the shift rod to be actuated by turning the spindle.

This shift arrangement is equally suitable for actuating a parking lock arrangement (e.g. as a park-by-wire parking lock) or some other component within a motor vehicle transmission which can be actuated by an axial movement.

In a corresponding manner, the above object is achieved by a method for actuating a shift clutch or a parking lock arrangement by means of a shift arrangement of a motor vehicle transmission, in particular a shift arrangement of the type according to the invention, wherein the shift arrangement has a spindle drive having a spindle and a nut, wherein the nut is pressed axially against a shift rod to exert an axial actuating force by turning the spindle and holding the nut in the circumferential direction.

In the case of the shift arrangement according to the invention, it is possible to engage and disengage the at least one gear stage and, if appropriate, a plurality of gear stages by means of just one shift motor, which is designed to turn the spindle about the spindle axis. The shift motor can be an electric motor, for example, which can be controlled in a simple manner.

The spindle and nut form a spindle drive, which can be formed by a conventional screw and a nut, for example, but can also be formed by a recirculating ball drive.

The shift rod is preferably mounted on the housing so as to be movable along a shift axis which is aligned parallel to the spindle axis. The shift axis is furthermore preferably arranged parallel to shafts of the motor vehicle transmission.

It is furthermore preferred that a plurality of shift rods should be mounted on the housing so as to be movable parallel to one another, said rods being arranged in a manner distributed around the spindle axis. In this case, each of the shift rods is assigned an axial guide, which is connected axially to the one radial groove provided on the housing (which can be designed as a partially circumferential or fully circumferential groove). This makes it possible to perform a selecting operation by turning the shift finger within the radial groove, during which the shift finger (which can also be referred to as a shift cam) is aligned with a target shift rod. During this selecting operation, the nut is preferably not held in the circumferential direction, with the result that it turns with the spindle. In order then to actuate the selected shift rod axially, the nut is held in the circumferential direction, with the result that, given a suitable direction of rotation of the spindle, it moves into the axial guide and is held there in the circumferential direction in order in this way to actuate the shift rod in the first axial direction.

Consequently, the basic idea of the present invention consists in implementing the selecting and the shifting function of a shift arrangement for a motor vehicle transmission by a method in which, in the case of a spindle drive, the nut is either prevented from turning relative to the spindle in order in this way to initiate an axial movement of the nut on the spindle. If, on the other hand, the nut is not prevented from turning on the spindle or is locked (fixed) on the spindle, the nut turns with the spindle. These two types of motion can thus be used for the selecting and the shifting function.

Moreover, the shift arrangement can be implemented with just a single shift motor. In addition, the shift arrangement can be of particularly compact construction both in the axial and in the radial direction and, in particular, can be significantly more compact than a single shift drum which has to actuate a plurality of gear stages.

Moreover, short shifting times can be achieved. In addition, there is a largely free choice of shift sequence in contrast to a shift arrangement having a single shift drum.

In particular, it is also possible, by means of the shift arrangement, to engage two gear stages simultaneously, and therefore the shift arrangement is suitable, in particular, also for use in combination with dual clutch transmissions.

A parking lock arrangement to be actuated by means of a shift arrangement of this kind can have a parking lock wheel connected to a shaft for example, wherein a parking lock pawl is pivotably mounted on a housing and can be pressed into a recess of the parking lock wheel by means of a sliding cone key. The axial actuation, required for this purpose, of the sliding cone key can be accomplished by means of the shift arrangement according to the invention. In this case, it is also possible to provide not only a plurality of shift rods for actuating shift clutches in the housing but also, in addition, a shift rod which is assigned to the engagement and disengagement of the parking lock arrangement.

The rotational position of the nut in the axial base position, in which the shift finger can be turned within the radial groove, is preferably measured by means of a suitable sensor arrangement. Here, the sensor arrangement can contain an incremental sensor, for example, and preferably has a zero point sensor in addition, allowing the spindle drive to be calibrated in a simple manner, especially after a reset of a control unit. In this case, such calibration can consequently be accomplished without the need to engage or disengage gear stages at the same time, as is generally the case with a shift drum. Moreover, it is possible in each case to detect the axial position of the shift rod or shift rods, for which purpose suitable sensor arrangements can likewise be provided.

The object is thus fully achieved.

According to a particularly preferred embodiment, the coupling between the nut and the shift rod is formed by the fact that, during the axial movement, the nut rests against the shift rod, in particular against an end face thereof, thus enabling the nut to transmit axial forces in the first axial direction to the shift rod, which is thus designed as a pushrod here. As a result, the coupling is particularly simple to implement in terms of design.

In another preferred embodiment, the shift rod can be moved in an opposite, second axial direction by means of a return device.

The return device can be implemented in many different ways, e.g. in a purely mechanical or in an electromechanical way. By virtue of the return device, there is the possibility that the nut will have to exert only a pushing force on the shift rod, and this considerably simplifies the overall design. In this case, the return device can ensure that the shift rod is moved back into an axial starting position again.

In the simplest case, the return device could be an elastic device which preloads the shift rod elastically counter to the first axial direction. In this case, the elastic preload could also be of switchable design.

However, it is particularly preferred if the return device has a return rod, which is movably mounted on the housing and which is assigned to the shift rod, and has a further axial guide, which is provided on the housing, adjoins the radial groove in an axial direction and in which the shift finger can engage in order to hold the nut in the circumferential direction, thus ensuring that said nut is moved axially during a rotation of the spindle, wherein the nut is coupled to the return rod at least during one section of this axial movement, thus ensuring that the return rod is moved in the first axial direction, and wherein the return rod is coupled to the shift rod in such a way that the axial movement of the return rod in the first axial direction leads to a movement of the shift rod in the second axial direction.

In this embodiment, the return device can be of purely mechanical design, significantly simplifying the overall construction. Moreover, it is possible here that the nut will in each case have to exert only pushing movements against the shift rod or the return rod, making it possible to achieve a forward and backward movement of the nut along the associated axial guides in a simple manner by reversing the direction of rotation of the spindle.

In this case, the coupling between the shift rod and the return rod is preferably such that, when the shift rod moves in the first axial direction, the return rod is moved in the second axial direction, thus allowing the nut to move the return rod in the first axial direction, preferably immediately upon entry into the further axial guide, in order to return the shift rod back again.

In this case, the shift rod and the return rod can be designed as pure pushrods. The coupling is preferably embodied as a mechanical positive coupling.

In general terms, it is possible for the return rod likewise to actuate a component in the motor vehicle transmission. However, it is particularly preferred if the return rod is at least not coupled to any shift clutch.

It is particularly preferred here if the shift rod and the return rod are coupled to one another by a two-sided lever.

In this case, the lever can be mounted pivotably on the housing in a central position, which is preferably on the spindle axis. It is furthermore possible in this case for the ends of the two-sided lever to be coupled in an articulated manner to the shift rod and to the return rod respectively. Instead of the coupling by means of a two-sided lever, it is also possible, for example, to set up the function that can be achieved thereby by designing the shift rod and return rod as racks, with a gear wheel or pinion being arranged between them.

In an alternative embodiment, which can also be provided in addition if appropriate, the return device has a further axial guide, which adjoins the radial groove in an axial direction and in which the shift finger can engage in order to hold the nut in the circumferential direction, thus ensuring that said nut is moved axially in the first axial direction when the spindle is rotated, and has a further radial groove, which adjoins the further axial guide in an axial direction at the opposite end, thus ensuring that the shift finger can engage from the opposite end in the axial guide associated with the shift rod in order to move the shift rod in the opposite, second axial direction.

The basic idea with this type of return device is that a further axial guide, which is designed in the manner of an "empty channel", is provided on the housing for the change-over of the nut between the first radial groove and the further radial groove. Consequently, the shift finger can be passed through this empty channel in order to transfer the position of the nut from the first radial groove to the further radial groove and vice versa.

According to another preferred embodiment, it is furthermore possible to equip the return device with a releasable clutch between the nut and the shift rod.

A releasable clutch of this kind can be designed as a mechanical clutch or as an electromagnetic clutch or the like, for example.

Overall, it is furthermore advantageous if the radial groove is assigned a stop, against which the nut strikes in a second axial direction opposed to the first axial direction in order to force the shift finger to turn in the radial groove.

In general terms, provision can be made for the nut to rotate with the spindle at the axial level of the radial groove purely by virtue of friction or the like. To force the nut to perform the rotary motion, however, it is preferable to provide a stop which holds the nut axially, ensuring that it is forced to turn.

In this case, the stop is preferably arranged on the spindle. It is thereby possible to ensure that the nut rotates at the same time during the selecting operation, without friction on the housing.

As an alternative, the stop is formed on the housing. In this version, it is possible, in particular, to prevent the nut from being "tightened" against a stop connected to the spindle, and an axial bearing can prevent the nut from being tightened against the stop or simplify release, if appropriate.

Moreover, a stop of this kind is simple to implement in terms of design.

It is particularly advantageous here if the stop is assigned a one-way clutch device, which allows turning of the nut in a first direction of rotation and blocks turning in the other direction of rotation in at least one predetermined rotational position.

By means of this measure, it is possible to move the nut against the stop in the second axial direction, after which the nut is then forced to turn, namely together with the spindle. Turning the nut in this direction of rotation is possible here by means of the one-way clutch device. Provision is furthermore made for turning in the other direction of rotation to be impossible, at least in a predetermined rotational position. As soon as the nut has reached this predetermined rotational position, the direction of rotation of the spindle can therefore be reversed, whereby the nut is held again in the circumferential direction by means of the one-way clutch device and once again moves in the first axial direction so as to be guided into an axial guide, for example.

Consequently, it is preferred if the predetermined rotational position is associated with an axial guide for the shift finger.

It is self-evident that, when the shift arrangement is embodied with a plurality of shift rods and associated axial guides, the one-way clutch device can block turning in the other direction of rotation, preferably in a corresponding number of predetermined rotational positions.

Consequently, it is likewise advantageous if the first direction of rotation is the direction of rotation with which the spindle is turned in order to move the nut in the second axial direction.

It is furthermore advantageous overall if the one-way clutch device has a one-way clutch contour on the nut or on the housing and at least one projection on the housing or on the nut, which interacts with the one-way clutch contour.

In this case, the one-way clutch contour can have an oblique contour section and a blocking contour section for example, wherein the blocking contour section is associated with the predetermined rotational position.

In this case, the projection is preferably preloaded elastically toward the one-way clutch contour, wherein the projection is preferably formed by means of a ball, in the manner of a ball detent device. However, the projection can also be implemented or designed in some other way.

It is furthermore advantageous here if the one-way clutch contour is formed on an axial end face of the nut, wherein the projection is mounted on the housing and is preloaded elastically in an axial direction toward the one-way clutch contour.

In this way, the one-way clutch contour can be implemented in a relatively simple manner and the nut can be implemented structurally without elastically preloaded elements. On the other hand, it is relatively simple to provide elastically preloaded projections on the housing. In a home position, the projections in this case preferably extend beyond a stop surface of the stop in an axial direction, with the result that the projections together with the one-way clutch contour form a kind of detent or latch device at the respective predetermined rotational position.

In the above-described embodiments of shift arrangements, it is assumed in general terms that the shift rod and the nut are mounted independently of one another on the housing, with the nut being supported indirectly on the housing via the spindle.

According to one version of a shift arrangement, which represents an independent invention, the nut is coupled securely to the shift rod, with the result that the shift rod is moved in a first axial direction in a first direction of rotation of the spindle, and is moved in an opposite axial direction in a second direction of rotation of the spindle.

In this embodiment, there is no need for a radial groove at the ends of an axial guide. On the contrary, only a single axial guide is provided for the shift rod or a shift finger of the nut.

This version of a shift arrangement is suitable particularly for vehicle transmissions which have only two gear stages, with the result that only one shift clutch pack is required, which can be actuated by means of a single shift fork. In this case, the single shift fork is preferably coupled rigidly to the shift rod. In an alternative version, this version of a shift arrangement is suitable for a park-by-wire parking lock arrangement.

Overall, it is possible with the shift arrangement according to the invention and the method according to the invention to achieve the aim of implementing shift actuation, in particular by electric motor, by means of a single electric motor. The shift arrangement is suitable particularly for dual clutch transmissions. Moreover, short shifting times can be achieved. Moreover, it is possible to a large extent to achieve free shift sequences. Finally, the shift arrangement can be implemented in an extremely compact way, both in the radial and in the axial direction, resulting in only low packaging requirements within the transmission housing. Moreover, the shift arrangement can be produced at low cost.

In general terms, it is possible, through suitable connections of shift rods of a transmission section, to prevent engagement of more than one gear stage in a transmission section. Moreover, in the case of a transmission which is not designed as a dual clutch transmission, such gear locking can achieve gear locking in respect of all the gear stages of the transmission, ensuring that only one single gear stage can be engaged.

In general terms, it is furthermore possible in the case of the dual clutch transmission to move shift rods in the same transmission section into a neutral position during the engagement of a gear stage in the same transmission section. As a result, it is not necessary to disengage a gear in the same transmission section but on a different shift rod, this being accomplished by actuating the currently actuated shift rod.

Whereas it has been assumed in general terms in the above embodiments that the nut "pushes" the shift rod in an axial direction, it is self-evident that, given suitable mechanical design, "pulling" of a shift stage is also possible in order to obtain movement of the shift rod in the first axial direction.

It is self-evident that the features mentioned above and those which will be explained below can be used not only in the respectively indicated combination but also in other combinations or in isolation without exceeding the scope of the present invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
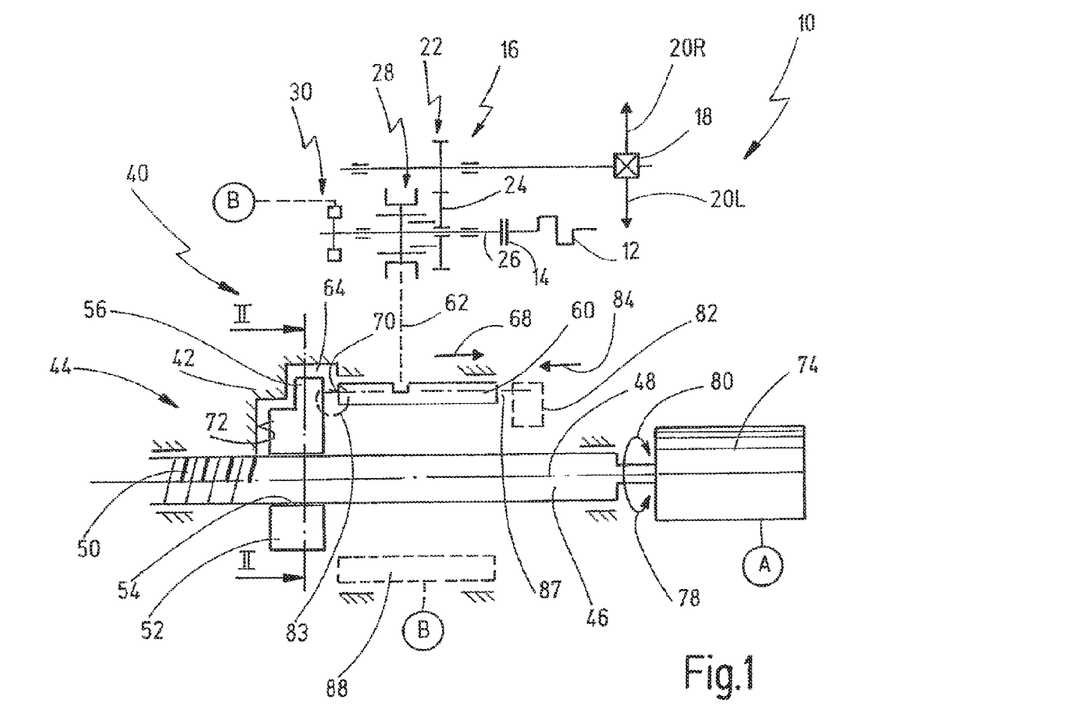
FIG. 1 shows a schematic illustration of a motor vehicle drive train having a schematically illustrated embodiment of a shift arrangement according to the invention.
Figure 2:
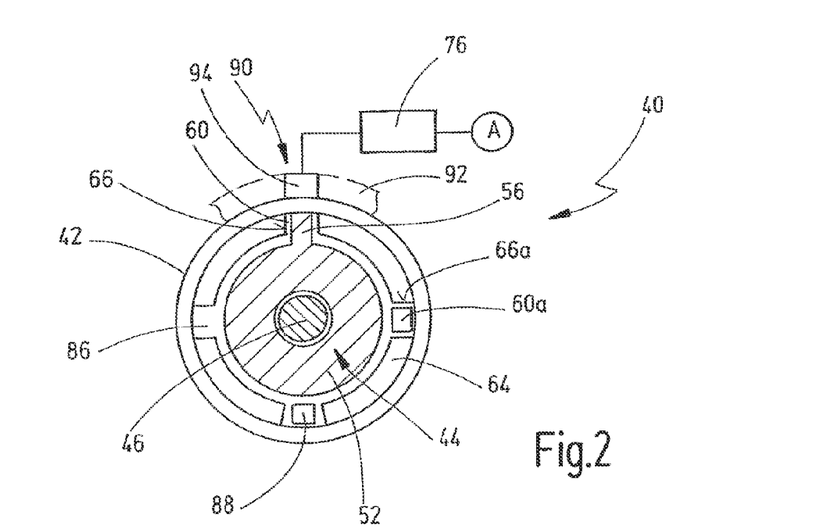
FIG. 2 shows a schematic illustration along a section line II-II in FIG. 1.

In FIGS. 1 and 2, a drive train for a motor vehicle is illustrated schematically and denoted overall by 10. The drive train 10 contains a drive motor 12, e.g. an internal combustion engine, the drive shaft of which is connected to a clutch arrangement 14. An output of the clutch arrangement 14 is connected to a transmission arrangement 16. An output of the transmission arrangement 16 is connected to a differential 18, by means of which motive power is distributed between two driven wheels 20L, 20R. In the present case, the transmission arrangement 16 is indicated only in a schematic way by means of an input shaft and an output shaft, which are connected to one another by a gear set 22. The transmission arrangement 16 is, in particular, a spur gear transmission, in particular a layshaft transmission. In particular, the transmission arrangement 16 can be an automated shift transmission, preferably a dual clutch transmission.

The gear set 22 has a free gear 24, which is mounted rotatably on a shaft 26 of the transmission arrangement 16. Arranged on the shaft 26 is a shift clutch, which can be of conventional construction, possibly being designed as a dog clutch for example but especially as a synchronizing shift clutch.

The shift clutch 28 has a sliding sleeve (not designated specifically), which can be moved in an axial direction on the shaft 26 in order to connect the free gear 24 to the shaft 26 for conjoint rotation and in this way to engage a gear stage, or to decouple it from the shaft 26 in order in this way to disengage the associated gear stage. In general, transmission arrangements 16 of this kind have at least one reverse gear stage and at least five forward gear stages, which are each assigned to one gear set and can be actuated by means of a corresponding number of shift clutches.

FIG. 1 furthermore shows that the drive train 10 can have a parking lock arrangement 30, which, for example, contains a parking lock wheel that is connected to one of the shafts (in this case shaft 26) for conjoint rotation. A parking lock wheel of this kind is preferably arranged on a shaft coupled securely for rotation to the differential 18. The parking lock arrangement 30 can have a parking lock pawl (not shown specifically), for example, which can be pivoted between a release position and a parking lock position, wherein in the parking lock position a tooth of the parking lock pawl engages in a recess in the parking lock wheel. A linear motion actuating member can be provided to actuate the parking lock pawl.

For automatic actuation of the shift clutch 28, a shift arrangement 40 is provided, which can be integrated into a housing 42 of the transmission arrangement 16 for example. The shift arrangement 40 contains a spindle drive 44, which has a spindle 46 that is aligned along a spindle axis 48 and has a spindle thread 50 on at least a section of its outer circumference. The spindle axis 48 is preferably aligned parallel to the shaft 26 of the transmission arrangement 16. The spindle drive 44 furthermore contains a nut 52 having a nut thread 54, which is in engagement with the spindle thread 50. The spindle drive 44 can also be designed as a recirculating ball spindle drive, which in general terms can contribute to a reduction in friction and hence to a reduction in the required motor torque of a motor for driving the spindle.

A radially projecting shift finger 56 is formed on an outer circumference of the nut 52, preferably extending over an angular range of <20°. The spindle 46 is rotatably mounted on the housing 42.

The shift arrangement 40 furthermore has a shift rod 60, which is mounted on the housing 42 in such a way as to be movable parallel to the spindle axis 48. The shift rod 60 is aligned with the shift finger 56 in the radial direction. The shift rod 60 is furthermore coupled to the shift clutch 28 by a suitable coupling 62, e.g. in the form of a shift fork. Axial movements of the shift rod 60 consequently lead to axial movement of the sliding sleeve of the shift clutch 28, thus enabling at least one gear stage to be engaged and disengaged by means of the shift rod 60.

Formed on the housing 42 is a radial groove 64, in which the shift finger 56 of the nut 52 engages in an axial base or home position, which is illustrated in FIG. 1. In the axial base position, the nut 52 can consequently turn in the circumferential direction, as can be seen in FIG. 2, for example. In FIGS. 1 and 2, the nut 52 has been turned in such a way that the shift finger 56 is aligned with the shift rod 60 in a circumferential direction.

If the gear stage associated with the gear set 22 is to be engaged, the spindle 46 is first of all turned in such a way that the nut 52, which is in the axial base position, is turned until the shift finger 56 is aligned with the axial guide 66 in the circumferential direction, as illustrated in FIGS. 1 and 2. By virtue of the nut 52 being held in the circumferential direction, the nut is introduced into the axial guide 66 by driving the spindle 46 in a suitable direction of rotation. As soon as the shift finger 56 engages in the axial guide 66, the nut 52 is held in the circumferential direction by the axial guide 66 and is consequently moved positively towards the shift rod 60 in a first axial direction 68 until the shift finger 56 strikes the shift rod 60 and takes it along in the first axial direction 68 in order in this way to actuate the shift clutch 28. For this purpose, a contact surface 70, on which the shift finger 56 engages, is formed on an axial end face of the shift rod 60.

The housing 42 furthermore has an axial stop 72 for the nut 52, wherein the axial stop 72 defines the axial base position. When, after moving the shift rod 60, the nut 52 is consequently moved in the opposite direction, more specifically by the spindle being driven in the opposite direction, the shift finger 56 therefore ultimately emerges from the axial guide 66, and the nut then comes into contact with the contact surface 70, and the nut can thus be turned in the axial base position by turning the spindle 46, while the shift finger 56 runs through the radial groove 64.

FIG. 2 shows that a plurality of shift rods 60 can be arranged on the housing 42 in a manner distributed in the circumferential direction (in this case shift rods 60 and 60*a*). Shift rod 60*a* is assigned a corresponding axial guide 66*a*. After the nut 52 has been turned in such a way that the shift finger 56 is aligned with shift rod 60*a*, it too can be moved in an axial direction in order to engage a gear stage assigned to the further shift rod 60*a*.

Typically, a shift rod 60 is in each case assigned to a sliding sleeve, which can actuate one or two shift clutches of a shift clutch pack in the manner known in the prior art. In a preferred embodiment, consequently, a dedicated shift rod 60, 60*a* . . . is to be provided for every two gear stages.

FIG. 1 shows a shift motor 74, which can be designed as an electric motor, for example, and the drive shaft of which is connected rigidly to the spindle 46, wherein the shift motor 74 can be activated by means of a control device 76 in such a way that said motor can be driven in a first direction of rotation 78 or in a second direction of rotation 80.

In order to ensure that the nut is moved in the first axial direction 68, starting from the axial base position, until the shift finger 56 engages in an axial groove 66, it is generally necessary to fix the nut 52 in the circumferential direction. For this purpose, a holding device (not shown specifically in FIGS. 1 and 2), which can be designed as a detent or latch device for example, can be provided. The holding device is preferably designed to hold the nut 52 in the circumferential direction, starting from the axial base position, at least until the shift finger 56 has engaged in the axial guide 66.

Owing to the fact that an axial movement of the shift rod 60 is exerted exclusively via a pushing force by means of the shift finger 56, a return device 82 is preferably provided, this being indicated schematically in FIG. 1 and being designed to move the shift rod, which has been moved in the first axial direction out of a neutral position, in a second axial direction 84, which is opposed to the first axial direction 68.

By means of the return device 82, it is consequently preferably also possible to move the shift rod 60 out of a neutral position, in which the shift clutch 28 and, if appropriate, a shift clutch assigned to the same shift clutch pack is open, in the axial direction 84 opposed to the first axial direction 68 as well in order, for example, to actuate such a second shift clutch of the same shift clutch pack.

By means of the above-described mode of operation of the spindle drive 44, the shift rod 60 (or further shift rods 60*a*, etc.) is consequently generally moved in the first axial direction 68. By means of the return device 82, the shift rod (or the shift rods) can each be moved in the opposite, second axial direction 84. Starting from the above-described neutral position, the return device 82 can consequently also serve to actuate a further shift clutch of the same shift clutch pack. In order to re-establish the neutral position from this position of the shift rod 60, the spindle drive 44 is once again actuated in the manner described above in order to return the shift rod 60 to the neutral position from the second shift position (in the first axial direction).

The return device 82 can be formed by a releasable coupling 83 between the nut 52 and the shift rod 60, for example, as indicated schematically in FIG. 1.

A return device 82 can furthermore be obtained by providing on the housing 42 another axial guide 86, although this is not assigned a shift rod and is consequently designed as an axial "empty channel". By turning the nut 52 in such a way that the shift finger 56 is aligned with this further axial guide 86, and by turning the spindle in such a way that the shift finger 56 passes through the further axial guide 86 in an axial direction, the nut 52 can consequently be moved to the axial end of the shift rod 60 opposite to the axial base position. At this opposite position, therefore, a further radial groove 87 is preferably provided for the shift finger 56, this being indicated schematically in FIG. 1. Within the further radial groove 87, the shift finger 56 can consequently be turned in the circumferential direction in order to align the shift finger with axial guide 66, for example. If the spindle is driven in a suitable way, the shift finger can then engage in axial guide 66 from the opposite side and can once again move the shift rod 60 in push mode in the second axial direction 84. The nut can then be moved back in the first axial direction 68, towards the further radial groove 87. The nut 52 can then be turned again until the shift finger 56 is aligned with the further axial guide 86, and the nut is then moved back in the second axial direction 84 towards the first axial base position, which is illustrated in FIGS. 1 and 2.

In this way, each shift rod 60, 60a can be actuated exclusively in push mode both in the first and in the second axial direction 68, 84, and thus all the shift rods 60, 60a etc. can be moved in both axial directions 68, 84 in order in this way to engage one or more gear stages of the transmission arrangement 16. In particular, it is possible, if the transmission arrangement 16 is formed by a dual clutch transmission, to engage one gear stage in each of the two transmission sections without the need to engage other gear stages in the meantime, as is generally the case with a sequential shift drum.

Overall, it is possible in this way to achieve very short shifting times.

It is self-evident that a pitch of the spindle thread 50 and of the nut thread 54 is set up in such a way that, on the one hand, axial forces required to engage and disengage the gear stages can be transmitted to the shift rod. On the other hand, the pitches are set up in such a way that the nut can be actuated relatively quickly in an axial direction, for which purpose the speed of the shift motor 74 can be adjusted in a suitable manner.

It is self-evident that the control device 76 is designed to control the shift motor in any desired manner, both as regards the rotational position and as regards the speed of rotation, in order to be able to obtain the above functions.

In making available the further radial groove 87, it is understood that a corresponding axial stop is preferably provided on the housing 42, said stop lying axially opposite the axial stop 72 for the axial base position. A holding device for holding the nut in the region of the further radial groove is likewise furthermore provided in order to enable the nut to enter one of the axial guides in a suitable rotational position.

FIGS. 1 and 2 furthermore illustrate schematically that a parking lock shift rod 88 can be provided on the housing 42. It is possible for the parking lock shift rod 88 to be designed and to be actuable in the same way as each of the shift rods 60. Here, as indicated schematically in FIG. 1, the parking lock shift rod 88 is coupled to the parking lock arrangement 30, with the result that the shift arrangement can also be used to shift the parking lock arrangement 30 backwards and forwards between a parking lock position and a release position.

In an alternative version, the shift arrangement 40 preferably has just one such parking lock shift rod 88 and no shift rods, the shift arrangement 40 thus being designed exclusively for actuating the parking lock arrangement.

In this case, however, the shift arrangement can also be constructed in the manner described below with reference to FIG. 9.

The shift arrangement 40 preferably has an incremental sensor 92, by means of which the relative rotational position of the shift finger 56 in relation to the housing 42 can be detected. The incremental sensor 92 is connected to the control device 76. Provision is furthermore preferably made to provide a zero position sensor 94 in one circumferential position, by means of which a predetermined position of the shift finger 56 in the circumferential direction can be determined. The zero position sensor 94 is also preferably connected to the control device 76. Instead of the incremental sensor 92 arranged on the housing 42, it is also possible to use a logic unit which uses an incremental sensor of the shift motor 74 to draw conclusions about the respective current rotational position of the nut 52.

The zero position sensor 94 serves, in particular, to detect a zero position in order in this way to calibrate an incremental sensor, particularly after a reset.

In the case of a reset of the control unit 76, the nut 52 can be moved into the axial base position without having to engage or disengage gear stages for this purpose. The nut 52 can then be turned until the zero position sensor 94 detects the predetermined rotational position of the nut 52 in order in this way to calibrate an incremental sensor.

FIGS. 3 to 8 show another embodiment of a shift arrangement according to the invention, which corresponds in general terms as regards construction and operation to the shift arrangement in FIGS. 1 and 2 and which is denoted by 40' in these figures. Identical elements are indicated by identical reference numerals. It is essentially the differences which are explained below.

Figure 3:
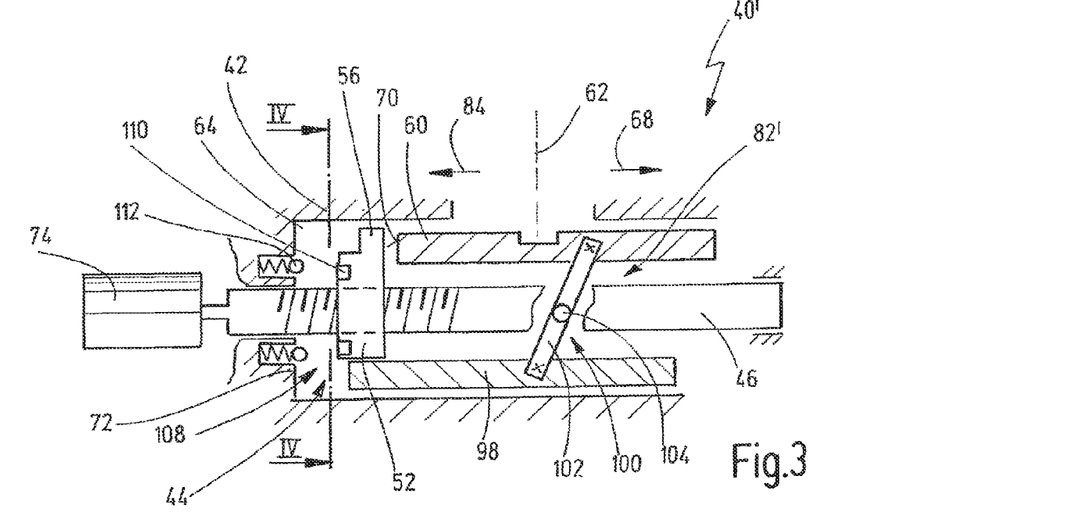
FIG. 3 shows a view comparable to FIG. 1 of another embodiment of a shift arrangement according to the invention.
Figure 4:
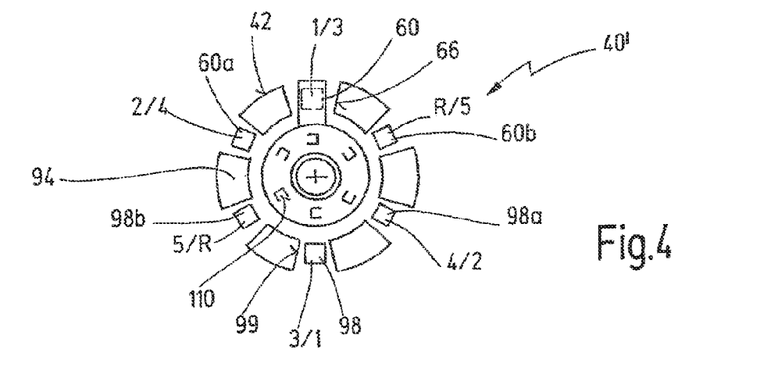
FIG. 4 shows a schematic sectional view along a line IV-IV in FIG. 3.

The shift arrangement 40' has another type of return device 82', which contains a return rod 98. In general terms, the return rod 98 is constructed like a shift rod 60 and is mounted on the housing 42 in such a way as to be axially movable in a further axial guide 99. The return rod 98 is provided in direct association with shift rod 60. In addition to the first shift rod 60, FIG. 4 shows two further shift rods 60a, 60b. Each of these shift rods 60, 60a, 60b is assigned a return rod 98, 98a, 98b. The return rods 98 are preferably arranged diametrically opposite the associated shift rods 60, i.e. on radially opposite sides of the nut 52, as can be seen especially in FIG. 4.

In the embodiment in FIGS. 3 to 8, shift rod 60 is assigned to gear stages 1, 3 of a transmission arrangement 16, which can be designed, in particular, as a dual clutch transmission. Shift rod 60a is assigned to gear stages 2, 4, and shift rod 60b is assigned to gear stages R, 5. Consequently, shift arrangement 40' is suitable for a vehicle transmission with five forward gear stages and one reverse gear stage. In the case of a transmission with six or seven stages, a further shift rod would consequently have to be provided in the circumferential direction, and a corresponding number of further shift rods would have to be provided in the case of a transmission with even more gear stages.

The shift rods 60, 60a, 60b are coupled to their respectively associated return rods 98, 98a, 98b by respective return coupling devices 100. The return coupling devices 100, of which only one is shown in FIG. 3, are designed in such a way that shift rod 60 and return rod 98 are each moved in opposite axial directions, such that return rod 98 is moved in the second axial direction 84 when shift rod 60 is moved in the first axial direction 68, and vice versa. Consequently, the return coupling device 100 is a kind of counterstroke positive coupling. In the present case, the return coupling device 100 is implemented by means of a lever 102 which extends substantially in a radial direction and can be pivoted on the housing 42, preferably at a pivotal attachment point 104 lying on the spindle axis 48. The two ends of the lever 104 are each connected in an articulated manner to shift rod 60 and to the associated return rod 98. Further levers 102, which are shown at 102a and 102b in FIGS. 6 and 7 for example, can be mounted on the housing 42 in a manner offset in an axial direction relative to lever 102.

In the case of the return device 82' in FIGS. 3 to 8, shift rod 60 can be moved in the second axial direction 84 and consequently moved back or returned from a position offset in first shifting direction 68 by once again moving the nut 52 into the axial base position and then turning it until the shift finger 56 is aligned with the associated return rod 98. Return rod 98 is then moved in the first axial direction 68, thereby necessarily moving shift rod 60 in the second axial direction 84.

It is self-evident that it is thereby possible to establish both a neutral position for shift rod 60 and also two shift positions which are associated with a first gear stage and a second gear stage, which can be actuated by means of a shift clutch pack.

Figure 6:
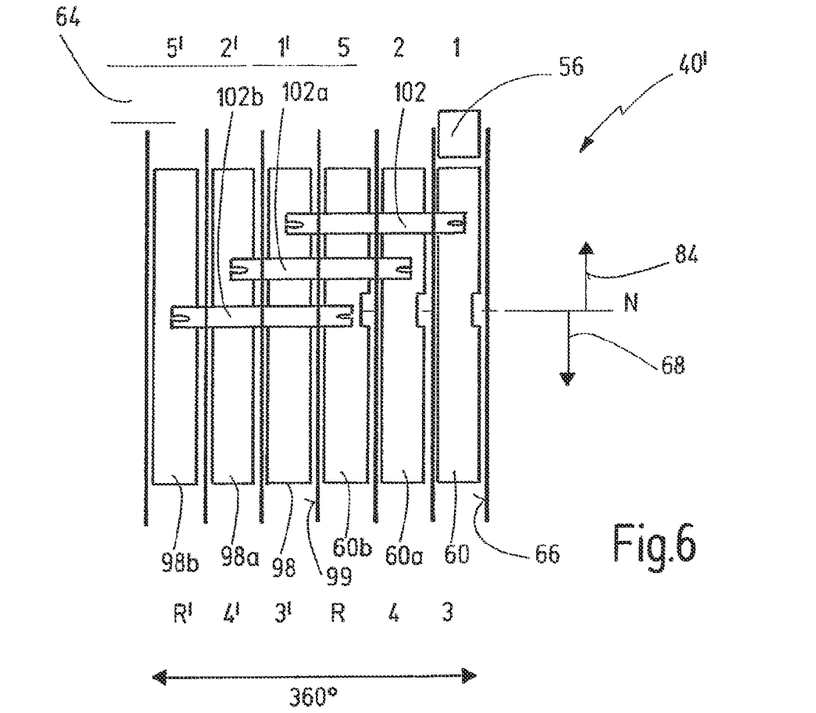
FIG. 6 shows a development of a shift arrangement of the kind shown in FIGS. 3 and 4, wherein all the shift rods are in a neutral position.
Figure 7:
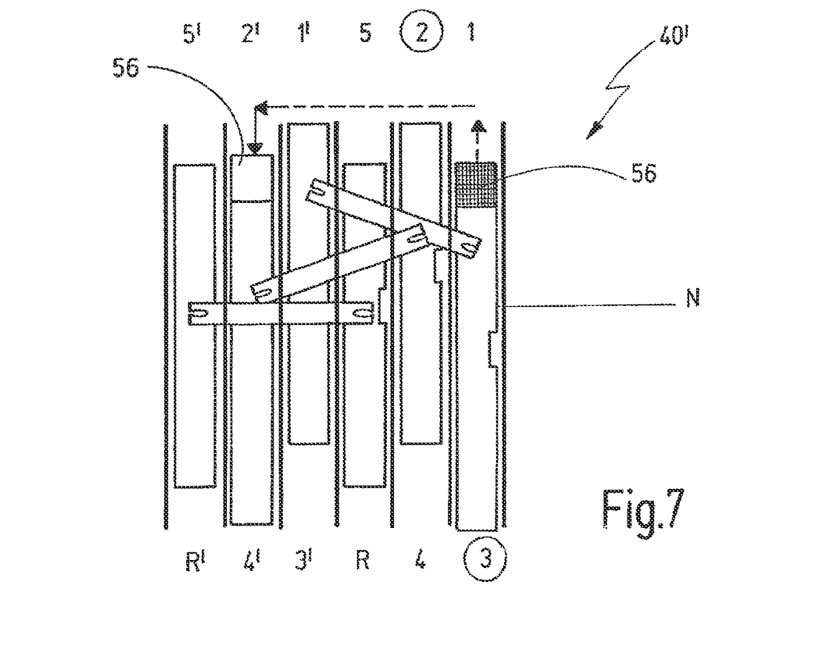
FIG. 7 shows an illustration corresponding to FIG. 6, wherein gear stages 2 and 3 are engaged.

This is shown by way of example in FIGS. 6 and 7, wherein FIG. 6 shows an illustration in which all the shift rods 60, 60*a*, 60*b* are aligned in the neutral position N thereof. In the illustration in FIG. 6, the shift finger 56 is in the axial guide 66.

Starting from this home position, the shift finger 56 can be moved in the first axial direction 68 by driving the spindle 46 in a suitable direction (depending on the pitch of the spindle thread 50), as a result of which shift rod 60 is taken along in the first axial direction in order in this way to engage gear stage 3, this being illustrated in FIG. 7. The associated return rod 98 is thereby moved in the second axial direction 84, this likewise being illustrated in FIG. 7, thereby pivoting the lever 102.

As illustrated by a dashed line in FIG. 7, the nut 52 can then be moved back, namely in the second axial direction 84, by reversing the direction of rotation of the spindle. During this process, shift rod 60 remains in the position in which gear stage 3 is engaged.

After reaching the axial base position (corresponding to the radial groove 64, which is indicated in FIG. 6) the nut 52 can be moved in a circumferential direction until the shift finger 56 is aligned with return rod 98*a*. The spindle 46 is then driven again in such a way that the nut 52 is moved in the first axial direction, as a result of which the shift finger 56 moves into the axial guide associated with return rod 98*a*, said axial guide not being shown specifically in FIG. 7. As a result, return rod 98*a* is moved in the first axial direction 68, whereby shift rod 60*a* is necessarily moved in the second axial direction 84 by means of lever 102*a*, thereby engaging gear stage 2, as illustrated in FIG. 7.

In the dual clutch transmission, it is consequently possible, with gear stage 3 engaged in the active transmission section, to preselect gear stage 2 already in order to prepare for a downshift operation. As an alternative, it would also have been possible for shift rod 60*a* to be moved in the first axial direction 68 in order to preselect gear stage 4 in the inactive transmission section and to prepare an upshift operation.

Starting from the illustration in FIG. 7, it is possible, for example, after transferring the motive power to the transmission section associated with gear stage 2, to disengage gear stage 3 again by moving the shift finger 56 initially back into the axial base position, subsequently turning it and then moving return rod 98 in the first axial direction 68 until the neutral position has been reached. The neutral position N can then be maintained or return rod 98 can be moved further in order to engage gear stage 1.

In the embodiment of shift arrangement 40' in FIGS. 3 to 8, it is consequently possible for the nut to be turned exclusively in the basic home position. Here, the provision of an "empty channel" 86 as in FIG. 2 is not necessary. The shifting times can thereby be considerably shortened.

In general terms, it is possible to couple the shift rods and/or the levers to one another in such a way that gear locking is achieved, preventing the engagement of several gear stages in one transmission section (in the case of a dual clutch transmission) or preventing the engagement of all the other gear stages when one gear stage is engaged (in the case of an automated shift transmission). However, no design details of a gear locking system of this kind are shown in the figures.

It is furthermore conceivable in general terms to set up a neutral positioning device which, when one gear stage is engaged in one transmission section, sets the other shift rods associated with the same transmission section to a neutral position. As a result, it is unnecessary to disengage a gear stage which is associated with the same transmission section but with a different shift rod, this being accomplished by actuating the current shift rod.

As described above, it is necessary, in order to turn the nut 52 in the axial base position, for said nut to strike an axial stop 72, which is aligned or associated in an axial direction with the radial groove 64. The axial stop 72 is preferably formed on the housing 42 but could also be formed on the spindle 46.

The above description furthermore states that, starting from the axial base position, the nut 52 must initially be held in order to introduce it into one of the axial guides 66, 99.

In the shift arrangement 40' in FIGS. 3 to 8, this is accomplished by means of a one-way clutch device, which is designed as a unilateral detent or latch device.

Figure 5:
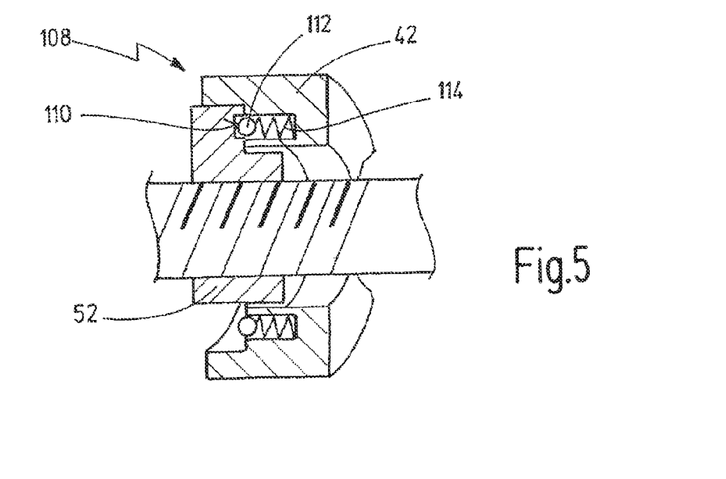
FIG. 5 shows a schematic illustration of a one-way clutch device for the shift arrangement in FIGS. 3 and 4 on an enlarged scale.

In this case, the one-way clutch device 108 is set up between the nut 52 and the housing 42 and, in the present case, contains a one-way clutch contour 110 on an axial end face of the nut 52 which faces the housing. The one-way clutch device 108 furthermore contains a plurality of projections 112, which are preloaded in an axial direction towards the nut 52 by means of respective springs 114 and project in an axial direction relative to the axial stop 72 in a home position. This is illustrated in relatively great detail in FIGS. 5 and 8, in particular. In this case, the projections 112 are arranged in a circumferential direction in such a way that each axial guide 66, 99 is assigned at least one projection 112, preferably two diametrically opposite projections, as illustrated in FIGS. 3 and 5.

In this case, the one-way clutch contour 110 has an oblique contour section 116 and a blocking contour section 118. The mode of operation of the one-way clutch device 108 is clearly evident from FIG. 8, in particular. When the nut strikes the axial stop 72 in an axial direction, the nut is forced to move in a circumferential direction if the spindle is turned further. The one-way clutch contour 110 is designed in such a way that the nut 52 can overrun the projections 112 in the manner of a one-way clutch, more specifically by virtue of the oblique contour sections 116, in this direction of rotation, in which the spindle is initially turned further in the direction of rotation corresponding to the second axial direction 84. In order then to achieve a reversal in the direction of the nut 52 into the first axial direction 68, the nut 52 is first of all turned in such a way that the shift finger 56 is associated with an axial guide 66. The spindle 46 is then driven in the opposite direction of rotation. As a result, the projection 112, which is preferably designed as a ball, comes up against the blocking contour section 118, with the result that the nut 52 cannot turn in the opposite direction of rotation and is consequently held securely in the circumferential direction. The nut 52 is thereby forced to move in the first axial direction 68. The blocking contour section 118 and the preloading or overlap of the projections 112 are chosen in such a way that the nut 52 is held in the circumferential direction until the shift finger 56 has fed into the axial guide 66.

Figure 8:
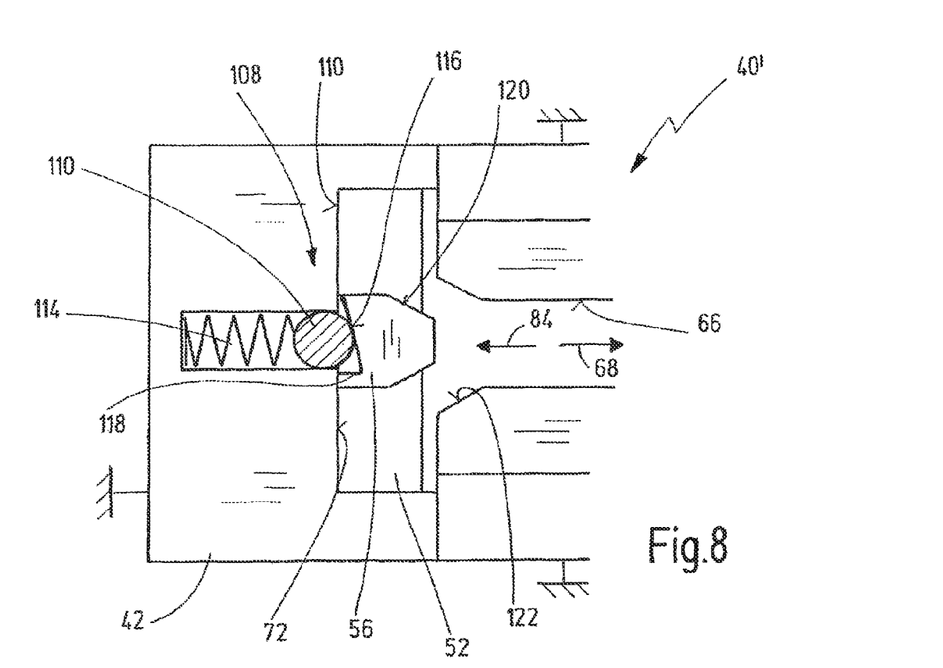
FIG. 8 shows a schematic plan view of a one-way clutch contour of another embodiment of a one-way clutch device for a shift arrangement according to the invention.

In order to make this easier, a suitable pair of chamfers 122 can be provided on the axial "mouth" of the axial guide 66, and the shift finger 56 can be designed in a corresponding manner with suitable chamfers 120 on the side facing the axial guide 66.

Figure 9:
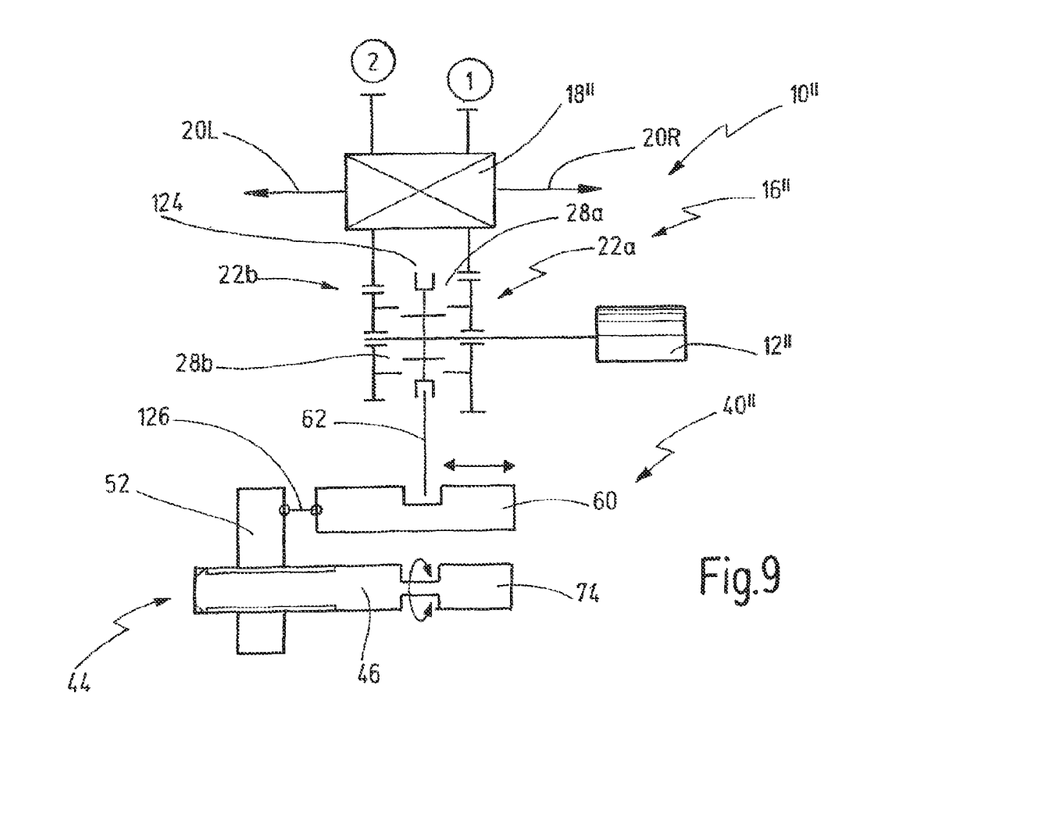
FIG. 9 shows a schematic illustration of a drive train in the form of a two-speed transmission having a further embodiment of a shift arrangement according to the invention.

FIG. 9 shows another embodiment of a drive train 10". Drive train 10" has a drive motor 12", which can be designed as an electric motor, for example. In the present case, the transmission arrangement 16" has precisely two gear stages, which can be set up by means of two gear sets 22a, 22b, which can be engaged and disengaged by means of a first shift clutch 28a and of a second shift clutch 28b, more specifically in alternation. The shift clutches 28a, 28b are integrated into a shift clutch pack, which can be actuated by means of a single sliding sleeve, which is coupled to a shift rod 60 by means of a coupling device 62. The gear sets 22a, 22b can have fixed gears, which are connected to a further shaft or are connected directly to an input member of a differential 18", and therefore in the present case the transmission has precisely two gear stages.

In this version, it is possible to actuate the shift clutch packs 124 implemented in this way by means of just one shift rod 60, which is actuated by means of a spindle drive 44 having a spindle 46 and a nut 52, as in the above embodiments.

In the present case, however, it is possible to couple the nut 52 to the shift rod 60 by means of a rigid coupling 126, thus enabling both pushing and pulling forces to be transmitted to the shift rod 60 via the rigid coupling 126.

Such an embodiment of a shift arrangement 40" is also alternatively suitable for engaging and disengaging a parking lock arrangement.

Overall, it is possible to achieve at least one of the following advantages with the present invention, depending on the embodiment.

A selecting and a shifting function can be implemented by enabling/enforcing or preventing rotation of the nut with the spindle by means of just a single drive. The shift arrangement can optionally be expanded by additional functions, e.g. a park-by-wire parking lock arrangement. The shift arrangement can be implemented in a very simple and robust manner. The shift arrangement can be integrated very well into a transmission package. Moreover, the shift arrangement can easily be expanded for a plurality of gear stages, that is to say more than six gear stages or more than seven gear stages. Moreover, the shift arrangement can be expanded by additional functions (park-by-wire) in a simple manner, if required.

The overall result is simplicity of manufacture with a relatively large number of identical parts. Compared with an embodiment in which the gear stages are actuated by means of a shift drum or in some other way, the overall structure of the transmission can remain unaffected.

By virtue of its compact construction, it is conceivable to arrange the shift arrangement close to associated shift clutches and to make the shift forks and articulation joints of the shift forks very short.

The invention claimed is:

1. Shift arrangement for a motor vehicle transmission which has at least one gear stage that can be engaged and disengaged by means of an associated shift clutch, having:
    a housing;
    a spindle, which is aligned along a spindle axis, has a spindle thread and is rotatably mounted on the housing;
    a nut, which has a nut thread, which is in engagement with the spindle thread, wherein a shift finger is formed on the nut;
    at least one shift rod, which is mounted movably on the housing and can be coupled to the shift clutch;
    a radial groove being provided on the housing, in which the shift finger engages in an axial base position of the nut and within which the shift finger can be turned; and
    an axial guide being provided on the housing, which axially adjoins the radial groove and in which the shift finger can engage in order to hold the nut in the circumferential direction, thus ensuring that said nut is moved axially in a first axial direction when the spindle is rotated;
    wherein the nut is coupled to the shift rod at least during one section of the axial movement, thus enabling a shift clutch coupled to the shift rod to be actuated by turning the spindle.

2. Shift arrangement according to claim 1, wherein the coupling between the nut and the shift rod is formed by the fact that the nut rests against the shift rod, thus enabling the nut to transmit axial forces in the first axial direction to the shift rod.

3. Shift arrangement according to claim 2, wherein the shift rod can be moved in an opposite, second axial direction by means of a return device.

4. Shift arrangement according to claim 3, wherein the return device has a return rod, which is movably mounted on the housing and which is assigned to the shift rod, and has a further axial guide, which is provided on the housing and adjoins the radial groove in an axial direction and in which the shift finger can engage in order to hold the nut in the circumferential direction, thus ensuring that said nut is moved axially during a rotation of the spindle, wherein the nut is coupled to the return rod at least during one section of this axial movement, thus ensuring that the return rod is moved in the first axial direction, and wherein the return rod is coupled to the shift rod in such a way that the axial movement of the return rod in the first axial direction leads to a movement of the shift rod in the second axial direction.

5. Shift arrangement according to claim 4, wherein the shift rod and the return rod are coupled to one another by a two-sided lever.

6. Shift arrangement according to claim 3, wherein the return device has a further axial guide, which adjoins the radial groove in an axial direction and in which the shift finger can engage in order to hold the nut in the circumferential direction, thus ensuring that said nut is moved axially in the first axial direction when the spindle is rotated, and has a further radial groove, which adjoins the further axial guide in an axial direction at the opposite end, thus ensuring that the shift finger can engage from the opposite end in the axial guide associated with the shift rod in order to move the shift rod in the opposite, second axial direction.

7. Shift arrangement according to claim 3, wherein the return device has a releasable clutch between the nut and the shift rod.

8. Shift arrangement according to claim 1, wherein the radial groove is assigned a stop, against which the nut strikes in a second axial direction opposed to the first axial direction in order to force the shift finger to turn in the radial groove.

9. Shift arrangement according to claim 8, wherein the stop is formed on the housing or on the spindle.

10. Shift arrangement according to claim 8, wherein the stop is assigned a one-way clutch device, which allows turning of the nut in one direction of rotation and blocks turning in the other direction of rotation in at least one predetermined rotational position.

11. Shift arrangement according to claim 10, wherein the predetermined rotational position is associated with an axial guide for the shift finger.

12. Shift arrangement according to claim 10, wherein the first direction of rotation is the direction of rotation with which the spindle is turned in order to move the nut in the second axial direction.

13. Shift arrangement according to claim 10, wherein the one-way clutch device has a one-way clutch contour on the nut or on the housing and at least one projection on the housing or on the nut, which interacts with the one-way clutch contour.

14. Shift arrangement according to claim 13, wherein the one-way clutch contour is formed on an axial end face of the nut, wherein the projection is mounted on the housing and is preloaded elastically in an axial direction toward the one-way clutch contour.

15. Method for actuating a shift clutch or parking lock arrangement by means of a shift arrangement of a motor vehicle transmission, wherein the shift arrangement comprises:

a housing;

a spindle, which is aligned along a spindle axis, has a spindle thread and is rotatably mounted on the housing;

a nut, which has a nut thread, which is in engagement with the spindle thread, wherein a shift finger is formed on the nut;

at least one shift rod, which is mounted movably on the housing and can be coupled to the shift clutch;

a radial groove being provided on the housing, in which the shift finger engages an axial base position of the nut; and an axial guide being provided on the housing, which axially adjoins the radial groove and in which the shift finger can engage in order to hold the nut in a circumferential direction, thus ensuring that said nut is moved axially in a first axial direction when the spindle is rotated, wherein the nut is coupled to the shift rod at least during one section of the axial movement, thus enabling a shift clutch coupled to the shift rod to be actuated by turning the spindle;

wherein the method comprises the steps of:

turning the shift finger in the radial groove of the housing; and pressing the nut axially against the shift rod to exert axial force by turning the spindle and holding the nut in the circumferential direction.

\* \* \* \* \*